United States Patent
Huang

(10) Patent No.: US 9,835,868 B2
(45) Date of Patent: Dec. 5, 2017

(54) NEAR-EYE DISPLAY DEVICE

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 0 days.

(21) Appl. No.: 15/213,388

(22) Filed: Jul. 18, 2016

(65) Prior Publication Data

US 2017/0299877 A1 Oct. 19, 2017

(30) Foreign Application Priority Data

Apr. 13, 2016 (TW) .............................. 105111444 A

(51) Int. Cl.
G02B 26/00 (2006.01)
G02B 26/08 (2006.01)
(Continued)

(52) U.S. Cl.
CPC ............ *G02B 27/2264* (2013.01); *G02B 5/04* (2013.01); *G02B 13/0095* (2013.01);
(Continued)

(58) Field of Classification Search
CPC ........ G02B 27/0172; G02B 2027/0178; G02B 27/017; G02B 2027/0127; G02B 27/2214;
(Continued)

(56) References Cited

U.S. PATENT DOCUMENTS 5,124,821 A 6/1992 Antier et al.
6,005,722 A * 12/1999 Butterworth ......... H04N 9/3114
348/742

(Continued)

FOREIGN PATENT DOCUMENTS

CN 201957179 U 8/2011
CN 104246578 A 12/2014
TW 201307896 A1 2/2013

OTHER PUBLICATIONS

Chenguang Ma et, al., "High-rank Coded Aperture Projection for Extended Depth of Field", the conference of International Conference on Computational Photography (ICCP-2013), 33 Oxford St., Harvard University, Cambridge MA USA 02138, Apr. 19-21, 2013.
(Continued)

*Primary Examiner* — Brandi Thomas
(74) *Attorney, Agent, or Firm* — CKC & Partners Co., Ltd.

(57) ABSTRACT

A near-eye display device includes at least one projection system configured to project an image to a target position. The projection system includes an image output module, an object lens group, an aperture-coded module, and an eyepiece. The image output module is configured to provide the image. The object lens group is configured to receive lights of the image, and includes a first lens group and a second lens group. The aperture-coded module is configured to receive the lights of the image from the first lens group and send the lights of the image to the second lens group, and the aperture-coded module sequentially provides plural coded patterns, such that the object lens group converts the image into plural relay images sequentially. The eyepiece is configured to send the relay images to the target position.

13 Claims, 5 Drawing Sheets

(51) Int. Cl.
- *G02F 1/29* (2006.01)
- *A61B 3/00* (2006.01)
- *G02B 27/22* (2006.01)
- *G02B 13/00* (2006.01)
- *G02B 25/00* (2006.01)
- *G02B 5/04* (2006.01)

(52) U.S. Cl.
CPC ....... *G02B 25/001* (2013.01); *G02B 26/0833* (2013.01); *G02B 27/2278* (2013.01)

(58) Field of Classification Search
CPC .... G02B 2027/0118; G02B 2027/0115; G02B 2027/011; G02B 2027/0123; G02B 2027/0132; G02B 2027/0134; G02B 2027/0152; G02B 2027/0187; G02B 27/0093; G02B 27/0101
USPC ........ 351/200, 205, 206, 209–211, 221, 222, 351/243–246; 359/237, 242, 265–267, 359/270–273, 315, 321, 322, 290–292, 359/298
See application file for complete search history.

(56) References Cited

U.S. PATENT DOCUMENTS

| | | | |
|---|---|---|---|
| 7,830,607 B2* | 11/2010 | Hotta | G02B 3/005 351/210 |
| 2009/0028451 A1* | 1/2009 | Slinger | G01T 1/295 382/233 |
| 2016/0091719 A1 | 3/2016 | Border | |

OTHER PUBLICATIONS

Shepard, R. Hamilton, Christy Fernandes-Cull, Ramesh Raskar, Boxin Shi, Christopher Barsi, and Hang Zhao. "Optical Design and Characterization of Advanced Computational Imaging System.", Optics and Photonics for information Processing VIII, Proc. of SPIE vol. 9216.
Patrick Llull, Xuejun Liao, Xin Yuan, Jianbo Yang, David Kittle, Lawrence Carin, Guillermo Sapiro, and David Brady, "Coded aperture compressive temporal imaging", May 6, 2013, vol. 21, No. 9. Optical Society of America.
Pertinent parts of U.S. Pat. No. 5,124,821.
Pertinent parts of US2016/0091719A1.

* cited by examiner

NEAR-EYE DISPLAY DEVICE

RELATED APPLICATIONS

This application claims priority to Taiwan Application Serial Number 105111444, filed Apr. 13, 2016, which is herein incorporated by reference.

BACKGROUND

Field of Invention

The present invention relates to a near-eye display device.

Description of Related Art

We are living in a colorful three-dimensional (3D) world, while conventional display technologies can provide no more than two-dimensional image lacking in depth information. The two-dimensional display has greatly limited the amount of information that people may acquire from the colorful 3D world. Rapid growths in electronic technologies, optical technologies, and optoelectronic technologies facilitate the development of three-dimensional display technologies that feature depth information of objects, and satisfy the needs of acquiring information of modern people. As a result, the three-dimensional display technologies have drawn attention in both academia and business communities.

Near-eye light field display is one of the simplest methods realizing the three-dimensional display. The near-eye display introduces a concept of light field reconstruction. For any three-dimensional reconstructed point, at least two light rays enter the pupil of a human eye, such that the eye may focus freely depending on different depths of images, which makes the observation more real and natural. The typical near-eye light field display adopts a spatial-multiplex method in which a light field effect is achieved by images of plural viewing angles through a lens array but the resolution of the images is reduced accordingly.

SUMMARY

The embodiments of the present invention provide a near-eye display device, which adopts a time-multiplex method and an aperture-coded module having plural different reflective patterns to achieve a light field effect. The aperture-coded module has plural coded patterns, which construct the different reflective patterns sequentially, such that plural images corresponding to the reflective patterns are formed sequentially, and thereby enhancing a depth of view. In some embodiments, the reflective patterns may be independent from each other, and all the information of independent viewing angles is sum up and constructs the light field. Alternatively, in some embodiments, the reflective patterns may be dependent and coded, and all the information of dependent viewing angles are added up and constructs the light field, which further enhances the brightness of images.

According to one aspect of this invention, a near-eye display device includes at least one projection system configured to project an image to a target position. The projection system includes an image output module, an object lens group, an aperture-coded module, and an eyepiece. The image output module is configured to provide the image. The object lens group is configured to receive lights of the image, and the object lens group includes a first lens group and a second lens group. The aperture-coded module is configured to receive the lights of the image from the first lens group and send the lights of the image to the second lens group, and the aperture-coded module sequentially provides plural coded patterns, such that the object lens group converts the image into plural relay images sequentially. The eyepiece is configured to send the relay images to the target position.

In some embodiments of the present invention, the projection system includes a first internal total reflection prism configured to send the lights coming from the first lens group to the aperture-coded module and send lights reflected by the aperture-coded module to the second lens group.

In some embodiments of the present invention, the image output module includes a solid-state lighting array and a micro display unit. The micro display unit is configured to receive lights from the solid-state lighting array and produce the image.

In some embodiments of the present invention, the image output module further includes a second internal total reflection prism configured to send the lights coming from the solid-state lighting array to the micro display unit and send lights reflected by the micro display unit to the object lens group.

In some embodiments of the present invention, the micro display unit and the aperture-coded module are both digital micromirror devices (DMD).

In some embodiments of the present invention, each of the coded patterns is a reflective pattern.

In some embodiments of the present invention, each of the coded patterns has a reflective region, and the reflective regions of the coded patterns are not located at the same position.

In some embodiments of the present invention, each of the coded patterns has a reflective region, and the reflective regions of the coded patterns are at least partially located at the same position.

In some embodiments of the present invention, the image output module includes at least one type of solid-state light sources, a number of the type of the solid-state light sources is A, a frame rate of the image output module is B, and a number of the coded patterns is less than B/A/60.

In some embodiments of the present invention, the projection system further includes a mirror configured to receive lights from the object lens group and reflect the lights to the eyepiece.

In some embodiments of the present invention, the number of the projection system is two.

In some embodiments of the present invention, the aperture-coded module includes plural coded apertures configured to provide the coded patterns, and the coded apertures are located at different positions of the aperture-coded module.

In some embodiments of the present invention, the coded apertures are arranged in a two-dimensional array.

It is to be understood that both the foregoing general description and the following detailed description are by examples, and are intended to provide further explanation of the invention as claimed.

DETAILED DESCRIPTION

Figure 1:
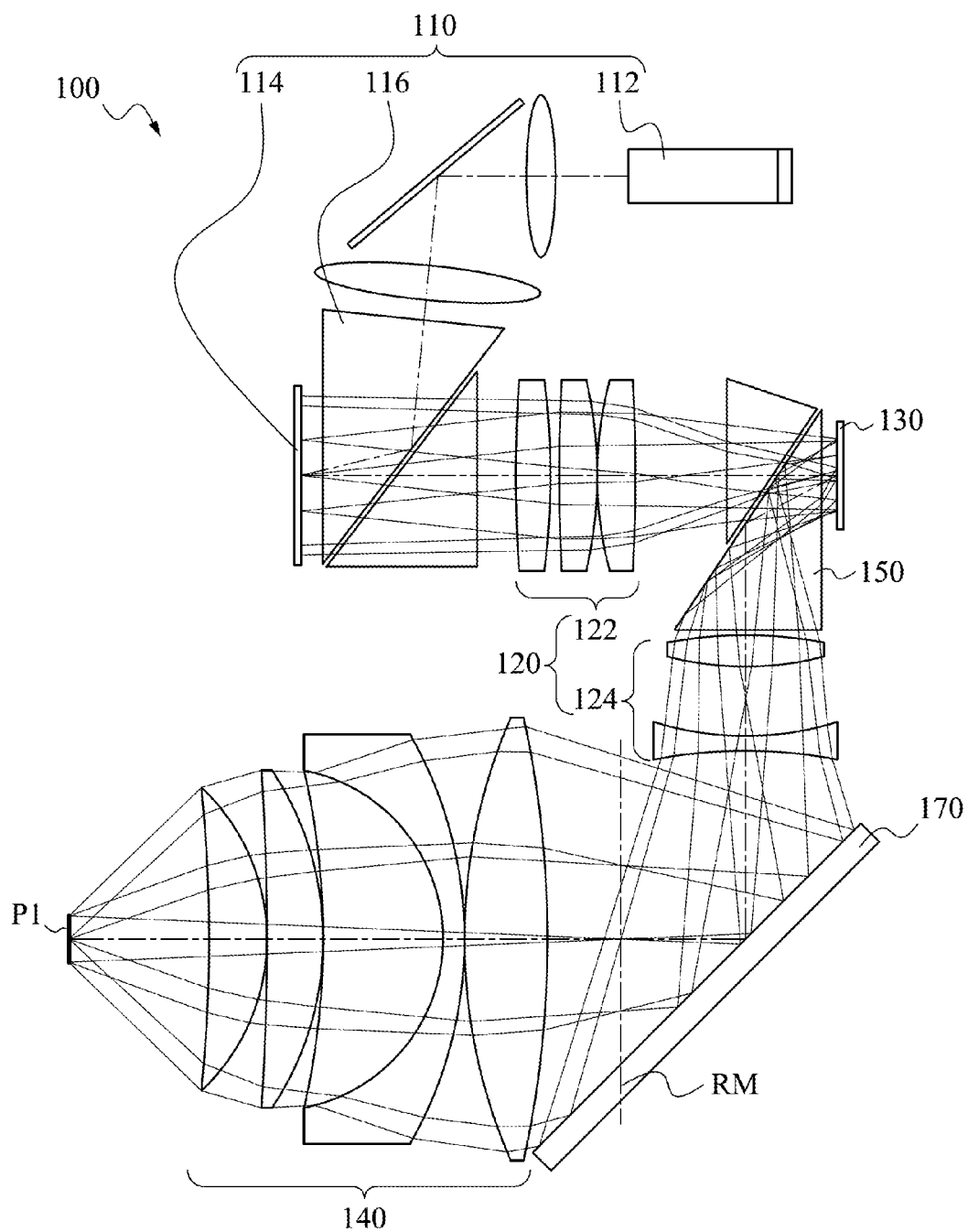
FIG. 1 is a schematic plan view of a near-eye display device according to some embodiments of this invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic plan view of a near-eye display device NED according to some embodiments of this invention. The near-eye display device NED includes at least one projection system 100. The projection system 100 is configured to project an image to a target position P1 (e.g. a retina of a user). The projection system 100 includes an image output module 110, an object lens group 120, an aperture-coded module 130, and an eyepiece 140. The image output module 110 is configured to provide the image. The object lens group 120 is configured to receive lights of the image, and the object lens group 120 includes a first lens group 122 and a second lens group 124. The aperture-coded module 130 is configured to receive the lights of the image from the first lens group 122 and send the lights of the image to the second lens group 124, and the aperture-coded module 130 sequentially provides plural coded patterns, such that the object lens group 120 converts the image into plural relay images RM sequentially. The eyepiece 140 is configured to send the relay images RM to the target position P1, so as to form a light field.

In the embodiments of the present invention, the aperture-coded module 130 is configured to have plural different coded patterns sequentially, and the different coded patterns determine the information of different viewing angles. For example, in the embodiments of the present invention, the aperture-coded module 130 may be a digital micromirror device (DMD), and the coded patterns of the aperture-coded module 130 are reflective patterns. The digital micromirror device is an array of plural micromirrors, and each of the mirrors represents a pixel. Each of the mirrors is connected with an independent driver, and a controlling element may respectively turn on or off each of the micromirrors, to determine whether a light is send to a determined position (i.e. the object lens group 120). Through the configuration, the aperture-coded module 130 may be configured to have different reflective patterns sequentially. In other embodiments, the aperture-coded module 130 may be liquid crystal on silicon (LCOS). It is noted that, in some embodiments, the aperture-coded module 130 may include transparent coded patterns, and the reflective patterns of the embodiments illustrated below should not limit the scope of the present invention.

A depth of view of an imaging system is related with a size of an aperture thereof. Herein, sizes of the coded patterns of the aperture-coded module 130 may respectively be smaller than a original range where light is distributed, such that the coded patterns of the aperture-coded module 130 act as an aperture of the near-eye display NED respectively, and thereby enhancing a depth of view of the near-eye display NED. Furthermore, by merging images corresponding to the plural different coded pattern of the aperture-coded module 130, a complete light field may be constructed. As a result, users may experience a three-dimensional version with depths of view in the light field. Herein, a detail configuration of the projection system 100 is first illustrated herein, and an operation method of the aperture-coded module 130 is illustrated later.

Referring to FIG. 1, the projection system 100 further includes a first internal total reflection prism (TIR prism) 150. The first internal total reflection prism 150 is configured to send the lights coming from the first lens group 122 to the aperture-coded module 130 and send lights reflected by the aperture-coded module 130 to the second lens group 124. The first internal total reflection prism 150 may couple the light operated in the first lens group 122 and the second lens group 124

Herein, the first internal total reflection prism 150 is adopted for sending lights coming from the first lens group 122 to the second lens group 124 through the aperture-coded module 130, but it is noted that the present invention is not limited thereto. In other embodiments, other known methods for separating the trace of the light incident on the aperture-coded module 130 from the trace of the light reflected by the aperture-coded module 130 may be adopted. For example, when the light is polarized (i.e. the aperture-coded module 130 is liquid crystal on silicon), a polarized splitter and a quarter wave plate may replace the first internal total reflection prism 150.

In one or more embodiments, the image output module 110 includes a solid-state lighting array 112, a micro display unit 114, and a second internal total reflection prism 116. The solid-state lighting array 112 may include at least one type of solid-state light sources (e.g. red light sources, green light sources, or blue light sources), which may be light-emitting diodes or organic light-emitting diodes. The second internal total reflection prism 116 is configured to send the lights coming from the solid-state lighting array 112 to the micro display unit 114 and send lights reflected by the micro display unit 114 to the object lens group 120. The micro display unit 114 is configured to receive lights from the solid-state lighting array 112. Like the aperture-coded module 130, the micro display unit 114 may also be a digital micromirror device. The micro display unit 114 is capable of selectively reflecting lights, so as to produce determined images. In other embodiments, the micro display unit 114 may be liquid crystal on silicon.

Similarly, in the present embodiments, the second internal total reflection prism 116 is adopted to send the lights from the solid-state lighting array 112 to the object lens group 120 through the adjustment of the micro display unit 114, but it should not limit the scope of the present invention. In other embodiments, other known methods for separating the trace of the light incident on the micro display unit 114 from the trace of the light reflected by the micro display unit 114 may be adopted. For example, when the light is polarized, a polarized splitter and a quarter wave plate may replace the second internal total reflection prism 116.

There may be other optical elements between the solid-state lighting array 112 and the second internal total reflection prism 116, such as the lenses and mirrors depicted in the figures. The lenses may concentrate lights onto respective units of the aperture-coded module 130, and the mirrors may save the spaces occupied by the light rays, and thereto reduces a size of the projection system 100.

In some embodiments of the present invention, though the micro display unit 114 and the aperture-coded module 130 may both be digital micomirror devices, the micro display unit 114 and the aperture-coded module 130 provide different functions respectively. The micro display unit 114 selectively reflects lights, so as to form the determined images. The aperture-coded module 130 is configured to provide coded patterns as the aperture. Other devices having the same functions may replace the configurations of the present embodiments.

In one or more embodiments, the projection system 100 further includes a mirror 170 configured to receive lights from the object lens group 120 and reflect the lights to the eyepiece 140, thereby reducing the size of the projection system 100. In addition, the eyepiece 140 is composed of plural lenses, so as to minimize the relay images RM and send the relay images RM to the target position P1, thereby forming a light field at the target position P1.

Figure 2:
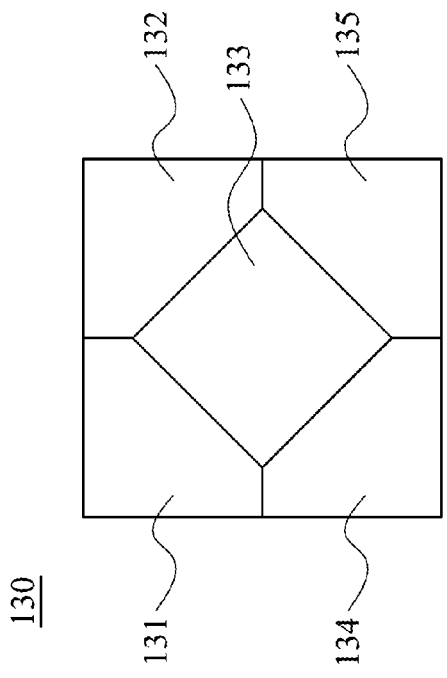
FIG. 2 is a plan view of an aperture-coded module of the near-eye display device of FIG. 1.
Figure 3:
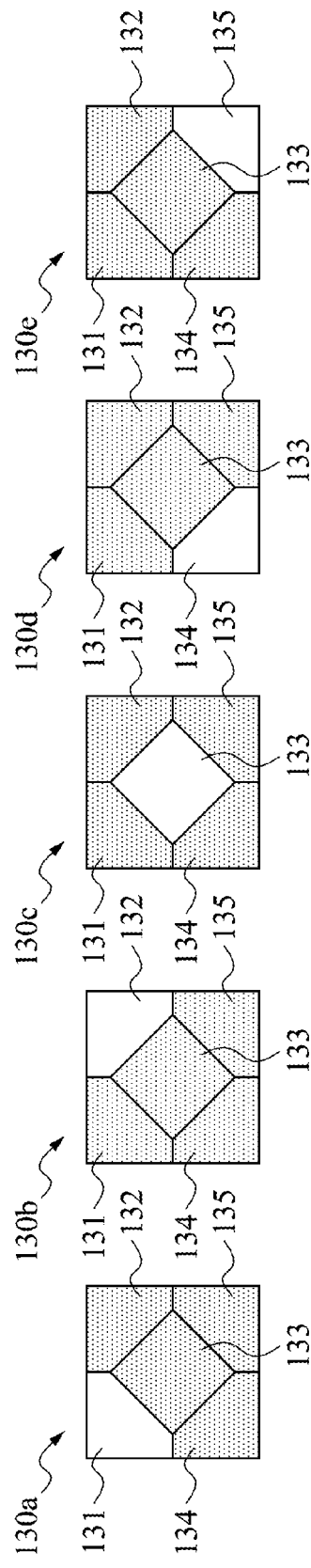
FIG. 3 is an operation-schematic view of the aperture-coded module of FIG. 2.

FIG. 2 is a plan view of an aperture-coded module 130 of the near-eye display device NED of FIG. 1. FIG. 3 is an operation-schematic view of the aperture-coded module 130 of FIG. 2. Reference is made to FIG. 1 to FIG. 3. In one or more embodiments of the present invention, the aperture-coded module 130 includes plural coded apertures 131~135, which are located at different positions of the aperture-coded module 130 and may be respectively activated to reflect or not to reflect lights independently. Through the coded apertures 131~135, the aperture-coded module 130 may provide plural coded patterns (which are referred to as reflective patterns 130a-130e herein) sequentially, such that the image is converted to plural the relay images RM sequentially. The relay images RM are imaged onto a retina of a user through the eyepiece 140, and the plural relay images RM work together to form a high-resolution image.

To be specific, the coded apertures 131~135 may be turned on sequentially, so that the aperture-coded module 130 provides the five different reflective patterns 130a-130e sequentially. That is, the coded apertures 131~135 are the reflective regions of the reflective patterns 130a-130e sequentially, and the reflective regions of the reflective patterns 130a-130e are not located at the same position, which means the reflective patterns 130a-130e are independent from each other. The reflective patterns 130a-130e of the aperture-coded module 130 sequentially produces the plural relay images, which are imaged onto the retina through the eyepiece 140, such that information of different viewing angles is sequentially formed on the retina. Herein, since the reflective regions of the reflective patterns are independent from each other, the information of different viewing angles is also independent from each other, the information of different viewing angles works together to substantially provide entire information of the light field.

In the embodiments of the present invention, the depth of view is increased through the above aperture-coded module 130. Refer to a formula to calculate depth of view: $D^2b/(A\pm bD)$, in which b is a diameter of a permissible circle of confusion, A is a width of the aperture (i.e. a width of the reflective region of one of the reflective patterns of the aperture-coded module 130), D is a focal length of a lens. In plural embodiments of the present invention, since the aperture-coded module 130 has a reduced width (i.e. A), the depth of view is increased. For example, since the coded apertures 131~135 are turned on sequentially, according to the reflective patterns 130a-130e of the aperture-coded module 130 in FIG. 3, a width of the reflective regions thereof may be substantially half of a width of the entire area of the aperture-coded module 130, and therefore the depth of view may be increased by twice.

However, it is noted that the configurations should not limit the scope of the present invention, and in some embodiments, the reflective patterns may not be independent from each other, and the reflective patterns may be coded adequately, which may be illustrated later in the embodiments of FIG. 5.

Figure 4:
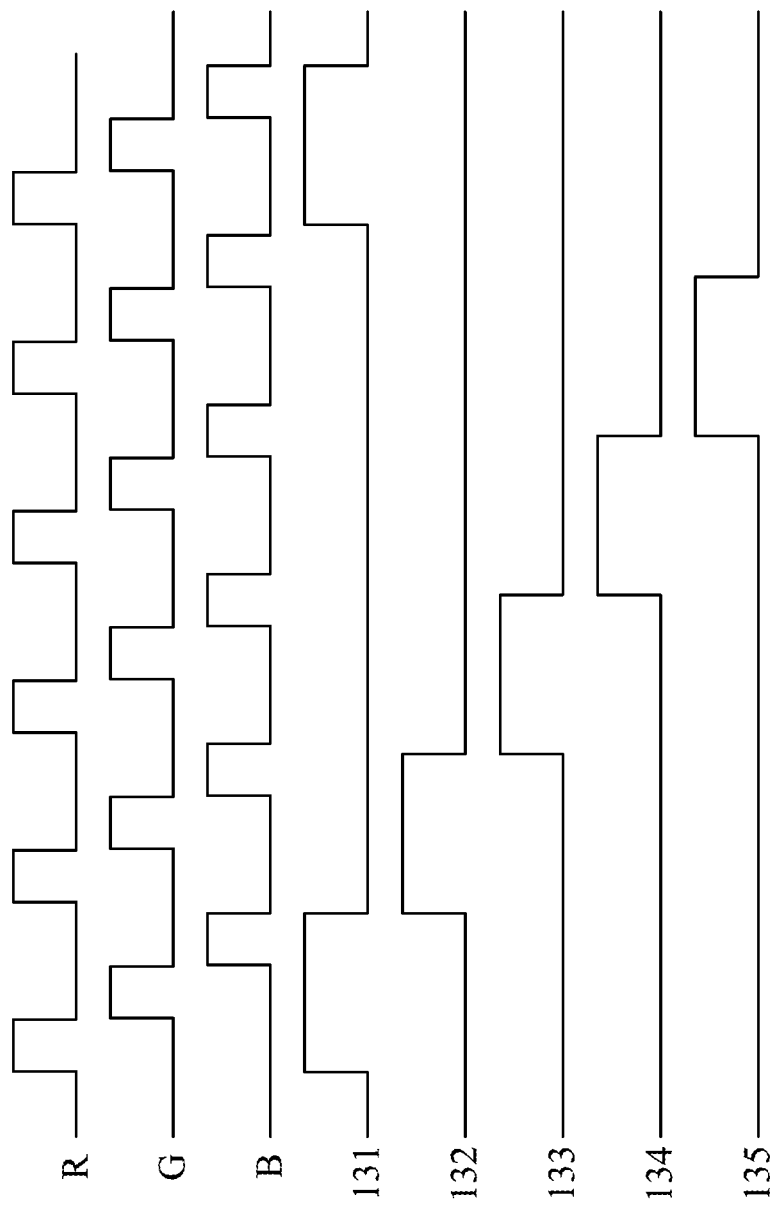
FIG. 4 is an operation-schematic view of plural elements of the near-eye display device of FIG. 1.

FIG. 4 is an operation-schematic view of plural elements of the near-eye display device NED of FIG. 1. Reference is made to FIG. 1, FIG. 3, and FIG. 4. Herein, the solid-state lighting array 112 including three types of solid-state light sources (which are red light sources, green light sources, and blue light sources) is taken as an example, and R, G, and B in FIG. 4 indicate the operations of the red light sources, the green light sources, and the blue light sources, respectively. As shown in FIG. 4, the red light sources, the green light sources, and the blue light sources are sequentially activated for higher resolution.

For enabling people to perceive dynamic consecutive images, dynamic changed images are designed to be displayed at a rate of 60 Hz. In view of the fact that the number of the reflective patterns 130a-130e of the aperture-coded module 130 is five, for the purposes that each of the images may form information of respective viewing angles through the reflective patterns 130a-130e and that images with different colors are output sequentially for enhancing the entire resolution, a frame rate of the image output module 110 should be at least 900 Hz (5*3*60).

In other words, in one or more embodiments of the present invention, the number of the reflective patterns should be designed based on the types of the solid-state light sources of the image output module 110 and the frame rate of the image output module 110. To be specific, if it is desired for the images to imaged onto the retina at a rate of 60 Hz, a number of the types of the solid-state light sources of the image output module 110 is A, and the frame rate of the image output module 110 is B, a number of the reflective patterns of the aperture-coded module 130 may be less than B/A/60.

Figure 5:
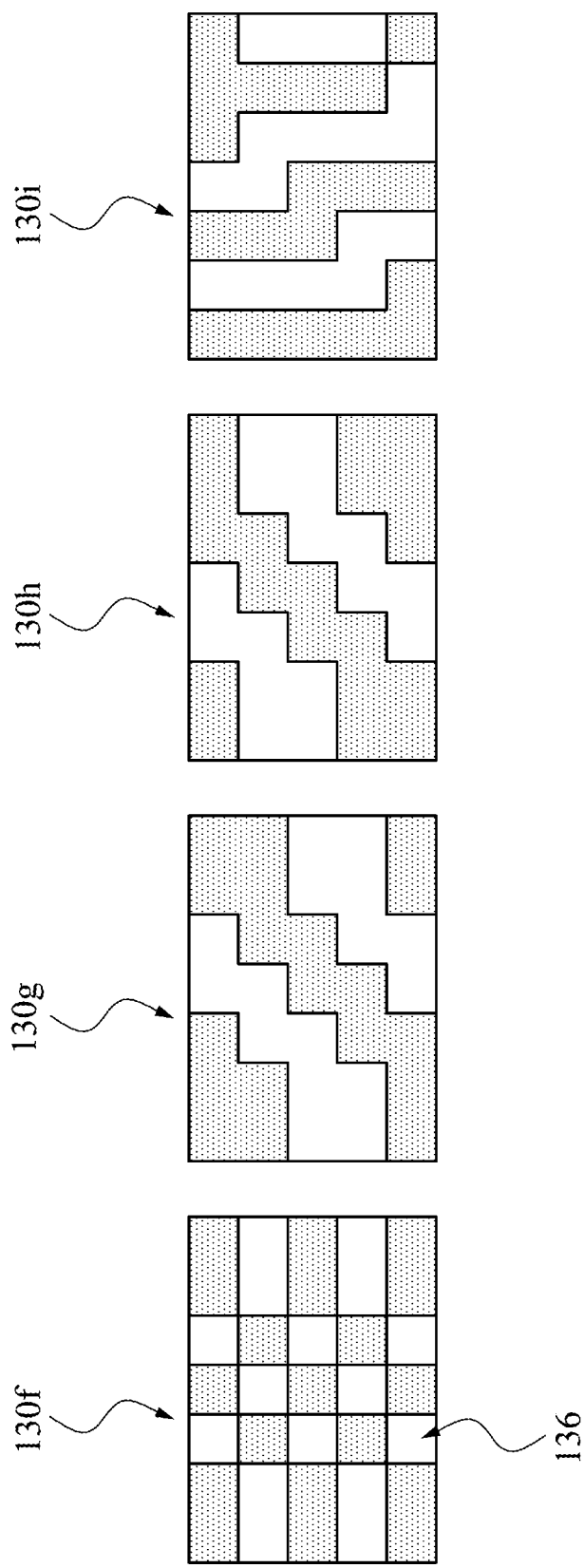
FIG. 5 is an operation-schematic view of an aperture-coded module according to another embodiment of this invention.

FIG. 5 is an operation-schematic view of an aperture-coded module 130 according to another embodiment of this invention. The present embodiments is similar to the embodiments of FIG. 3, and the difference is that: the aperture-coded module 130 has different reflective patterns 130f-130i sequentially, and the reflective patterns 130f-130i are not independent from each other (alternatively, dependent on each other). To be specific, a portion of the reflective portions of at least a portion of the reflective patterns 130f-130i are located at the same position. Herein, the dependent reflective patterns 130f-130i are coded, such that one of the reflective patterns 130f-130i may carry information of different viewing angles. The information of different viewing angles is combined on the retina to substantially provide entire information of the light field. In addition, through the dependent information of different viewing angles, a number of the reflective patterns 130f-130i may be reduced, and thereby enhancing the brightness and resolution of the light field.

In the present embodiments, the coded-apertures 136 of the aperture-coded module 130 are squares, and arranged in a two-dimensional array to form the reflective patterns 130f-130i sequentially. The present invention is not limited thereto, and the coded-apertures 136 may also be arranged in a one-dimensional array or in a concentric circle. Other details of the present invention are substantially described as above, and thereto not repeated herein.

Figure 6:
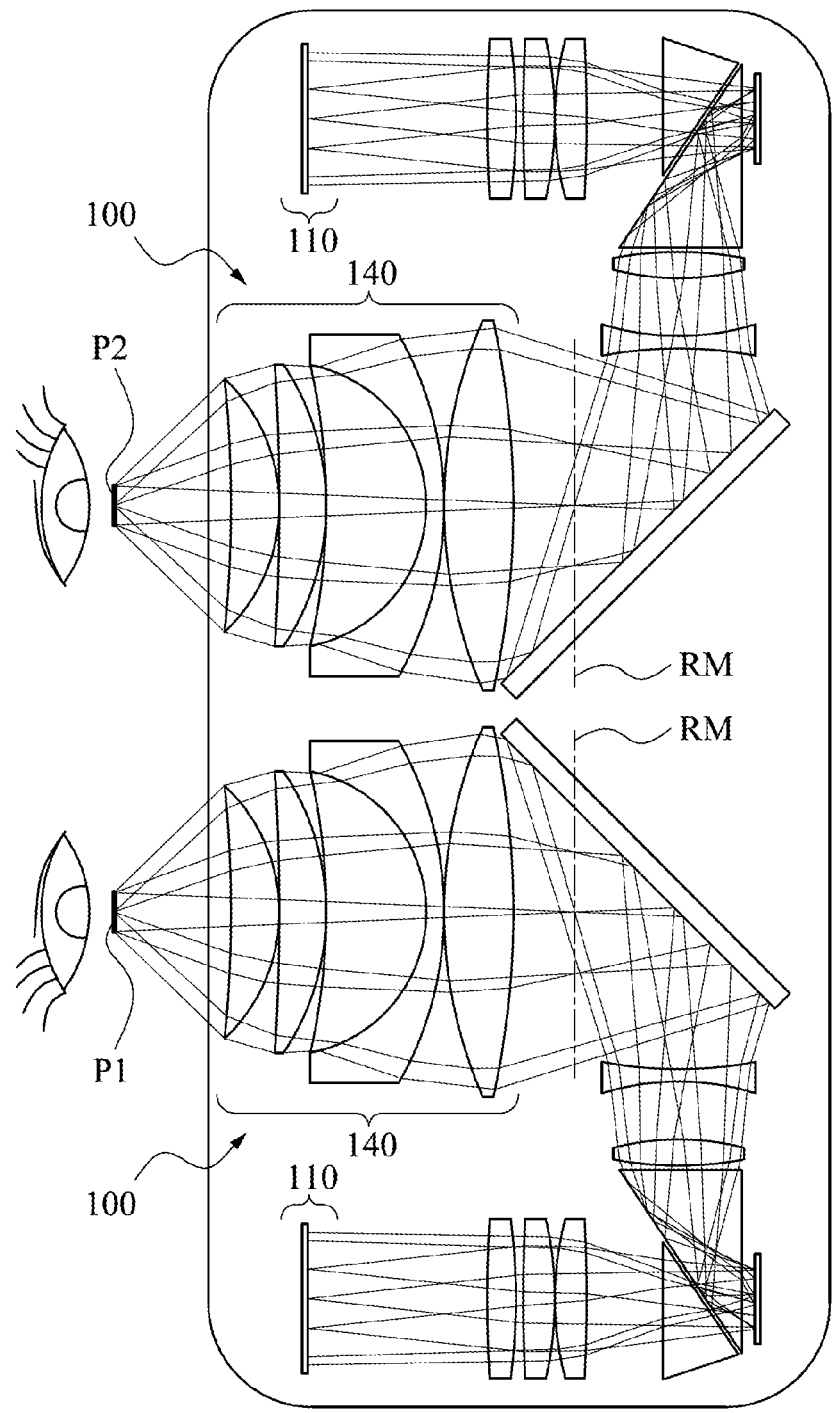
FIG. 6 is a schematic plan view of a near-eye display device according to another embodiment of this invention.

FIG. 6 is a schematic plan view of a near-eye display device NED according to another embodiment of this invention. The present embodiments is similar to the embodiments of FIG. 1, and the difference is that: the near-eye display device NED includes two projection systems 100. Herein, the image output modules 110 of the two projection systems 100 may provides different image information to left and right eyes respectively, and the image information of left and right eyes is combined in the brain of the users, and thereto the users may experience of stereo images.

As previous illustration, images are coded through the aperture-coded modules 130 in the projection systems 100, and therefore plural different relay images RM are formed at different timings. The eyepieces 140 send the relay images RM to the target positions P1 and P2 respectively, thereby forming light fields respectively.

In the present embodiments, the image output modules 110 of the projection systems 100 are briefly depicted as display modules that directly provide image. It is noted that the image output modules 110 may also adopt the configuration shown in FIG. 1. Other details of the present embodiments are similar to those described in the embodiments of FIG. 1, and thereto not repeated herein.

The embodiments of the present invention provide a near-eye display device, which adopts a time-multiplex method and an aperture-coded module having plural different reflective patterns to achieve a light field effect. The aperture-coded module has plural coded patterns, which construct the different reflective patterns sequentially, such that plural images corresponding to the reflective patterns are formed sequentially, and thereby enhancing a depth of view. In some embodiments, the reflective patterns may be independent from each other, and all the information of independent viewing angles is sum up and constructs the light field. Alternatively, in some embodiments, the reflective patterns may be dependent and coded, and all the information of dependent viewing angles is added up and constructs the light field, which further enhances the brightness of images.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A near-eye display device with two projection systems, wherein each of the projection systems is configured to project an image to a target position, wherein the projection system comprises:
    an image output module configured to provide the image;
    an object lens group configured to receive lights of the image coming from the image output module, and comprising a first lens group and a second lens group;
    an aperture-coded module configured to receive the lights of the image from the first lens group and send the lights of the image to the second lens group, and the aperture-coded module sequentially providing a plurality of coded patterns, such that the object lens group converts the image into a plurality of relay images sequentially; and
    an eyepiece configured to send the relay images to the target position, wherein optic axes of the eyepieces of the projection systems are parallel with each other, and a distance between the eyepieces of the projection systems is less than a distance between the image output modules of the projection systems.

2. The near-eye display device of claim 1, wherein each of the projection systems comprises:
    a first internal total reflection prism configured to send the lights coming from the first lens group to the aperture-coded module and to send lights reflected by the aperture-coded module to the second lens group.

3. The near-eye display device of claim 1, wherein the image output module comprises:
    a solid-state lighting array; and
    a micro display unit configured to receive lights from the solid-state lighting array and produce the image.

4. The near-eye display device of claim 3, wherein the image output module further comprises:
    a second internal total reflection prism configured to send the lights coming from the solid-state lighting array to the micro display unit and to send lights reflected by the micro display unit to the object lens group.

5. The near-eye display device of claim 3, wherein the micro display unit and the aperture-coded module are both digital micromirror devices (DMD).

6. The near-eye display device of claim 1, wherein each of the coded patterns is a reflective pattern.

7. The near-eye display device of claim 6, wherein each of the coded patterns has a reflective region, and the reflective regions of the coded patterns are not located at the same position.

8. The near-eye display device of claim 6, wherein each of the coded patterns has a reflective region, and at least partially the reflective regions of the coded patterns are located at the same position.

9. The near-eye display device of claim 1, wherein the image output module comprises at least one type of solid-state light sources, a number of the type of the solid-state light sources is A, a frame rate of the image output module is B, and a number of the coded patterns is less than B/A/60.

10. The near-eye display device of claim 1, wherein each of the projection systems further comprises:
    a mirror configured to receive the lights from the object lens group and reflect the lights to the eyepiece.

11. The near-eye display device of claim 1, wherein the aperture-coded module comprises a plurality of coded apertures configured to provide the coded patterns, wherein the coded apertures are located at different positions of the aperture-coded module.

12. The near-eye display device of claim 11, wherein the coded apertures are arranged in a two-dimensional array.

13. The near-eye display device of claim 1, wherein the image output module comprises:
    a light source; and
    a micro display unit comprising a plurality of pixels configured to receive lights from the light source and generate the image.

* * * * *